United States Patent
Marelas

(10) Patent No.: US 10,664,619 B1
(45) Date of Patent: May 26, 2020

(54) AUTOMATED AGENT FOR DATA COPIES VERIFICATION

(71) Applicant: EMC IP Holding Company LLC, Hopkinton, MA (US)

(72) Inventor: Peter Marelas, Donvale (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 172 days.

(21) Appl. No.: 15/877,706

(22) Filed: Jan. 23, 2018

Related U.S. Application Data

(63) Continuation-in-part of application No. 15/799,088, filed on Oct. 31, 2017.

(51) Int. Cl.
| | |
|---|---|
| *G06F 21/00* | (2013.01) |
| *G06F 21/64* | (2013.01) |
| *H04L 29/06* | (2006.01) |
| *G06N 20/00* | (2019.01) |

(52) U.S. Cl.
CPC ............ *G06F 21/64* (2013.01); *G06N 20/00* (2019.01); *H04L 63/1416* (2013.01); *H04L 63/1441* (2013.01)

(58) Field of Classification Search
CPC ...... G06F 21/64; G06F 3/0608; G06F 3/0641; G06F 16/1748; G06F 11/1441; G06F 11/2094; H04L 63/1425; H04L 63/1416; G06N 20/00
USPC .......................................................... 726/23
See application file for complete search history.

(56) References Cited

U.S. PATENT DOCUMENTS

| | | | |
|---|---|---|---|
| 7,089,241 B1* | 8/2006 | Alspector | ............ G06Q 10/107 |
| 7,702,631 B1* | 4/2010 | Basu | .................. G06F 16/24556 |
| | | | 707/999.006 |
| 7,899,796 B1* | 3/2011 | Borthwick | ........ G06F 16/24556 |
| | | | 707/692 |
| 8,126,852 B1 | 2/2012 | Patterson | |
| 9,075,532 B1 | 7/2015 | Bromley | |
| 9,378,106 B1 | 6/2016 | Ben-Moshe et al. | |
| 9,396,243 B1 | 7/2016 | Halevi et al. | |
| 2002/0055942 A1 | 5/2002 | Reynolds | |
| 2002/0152375 A1 | 10/2002 | Shigematsu et al. | |
| 2004/0015724 A1 | 1/2004 | Pham | |
| 2004/0153653 A1* | 8/2004 | Abhyankar | ......... G06F 21/6209 |
| | | | 713/179 |
| 2005/0131902 A1 | 6/2005 | Saika | |

(Continued)

OTHER PUBLICATIONS

Kolb, Lars, Andreas Thor, and Erhard Rahm. "Dedoop: Efficient deduplication with hadoop." Proceedings of the VLDB Endowment 5.12 (2012): 1878-1881 (Year: 2012).*

(Continued)

*Primary Examiner* — Syed A Zaidi

(74) *Attorney, Agent, or Firm* — Chamberlain, Hrdlicka, White, Williams & Aughtry

(57) ABSTRACT

The implementation of an automated agent for data copy verification. Specifically, the implementation entails the execution of an intelligent, machine-learning based method and system for determining the integrity of data copies (i.e., for identifying whether data copies of a same data set have been impacted by malicious activities). Upon determining that data integrity is likely compromised, one or more corrective actions may be triggered. These actions may mitigate the spread of corruption and/or infection.

20 Claims, 9 Drawing Sheets

(56) References Cited

U.S. PATENT DOCUMENTS

| | | | |
|---|---|---|---|
| 2007/0050620 A1 | 3/2007 | Pham et al. | |
| 2007/0180239 A1 | 8/2007 | Fujibayashi et al. | |
| 2008/0065630 A1* | 3/2008 | Luo | G06F 16/258 |
| 2008/0091818 A1* | 4/2008 | Bailey | H04L 43/00 |
| | | | 709/224 |
| 2009/0132616 A1* | 5/2009 | Winter | G06F 11/1451 |
| 2009/0177484 A1* | 7/2009 | Davis | G06Q 30/02 |
| | | | 705/346 |
| 2010/0082672 A1 | 4/2010 | Kottomtharayil | |
| 2010/0250501 A1* | 9/2010 | Mandagere | G06F 16/24556 |
| | | | 707/692 |
| 2010/0250896 A1 | 9/2010 | Matze | |
| 2010/0281081 A1 | 11/2010 | Stager et al. | |
| 2011/0026898 A1 | 2/2011 | Lussier et al. | |
| 2011/0055471 A1 | 3/2011 | Thatcher et al. | |
| 2012/0016848 A1 | 1/2012 | Tofano | |
| 2012/0159175 A1* | 6/2012 | Yocom-Piatt | G06F 11/1453 |
| | | | 713/176 |
| 2012/0237180 A1 | 9/2012 | Yoshioka | |
| 2014/0187239 A1 | 7/2014 | Friend et al. | |
| 2014/0188986 A1 | 7/2014 | Levy et al. | |
| 2014/0277604 A1* | 9/2014 | Nixon | G05B 19/4185 |
| | | | 700/47 |
| 2015/0006475 A1 | 1/2015 | Guo et al. | |
| 2015/0127621 A1 | 5/2015 | Kuo | |
| 2016/0004975 A1* | 1/2016 | Chamness | G06F 16/2365 |
| | | | 706/11 |
| 2016/0019282 A1* | 1/2016 | Lewis | G06F 16/35 |
| | | | 707/740 |
| 2016/0098021 A1* | 4/2016 | Zornio | G06F 16/00 |
| | | | 700/47 |
| 2016/0314412 A1* | 10/2016 | Chamness | G06F 11/08 |

OTHER PUBLICATIONS

Sunita Sarawagi and Anuradha Bhamidipaty. 2002. Interactive deduplication using active learning. In Proceedings of the eighth ACM SIGKDD international conference on Knowledge discovery and data mining (KDD '02). ACM, New York, NY, USA, 269-278 Year: 2012).*

Dinerstein, Jared, et al. "Learning-based fusion for data deduplication." 2008 Seventh International Conference on Machine Learning and Applications. IEEE, 2008. (Year: 2008).*

NPL Search Results (Year: 2020).*

IEEE P1619.3/D1, Draft Standard for Key Management Infrastructure for Cryptographic Protection of Stored Data (May 2007), IEEE, Piscataway, NJ 2007 (44 pages).

* cited by examiner

AUTOMATED AGENT FOR DATA COPIES VERIFICATION

CROSS-REFERENCE TO RELATED APPLICATIONS

The present application is a continuation-in-part of U.S. patent application Ser. No. 15/799,088, filed on Oct. 31, 2017, which is hereby incorporated in its entirety.

BACKGROUND

Computing systems generate an unfathomable amount of data copies during various operations. Presently, assessing the integrity of data copies is a largely uncommon task due to the sheer volume of data involved, as well as the storage and processing needs required to perform the assessments.

DETAILED DESCRIPTION

Figure 1:
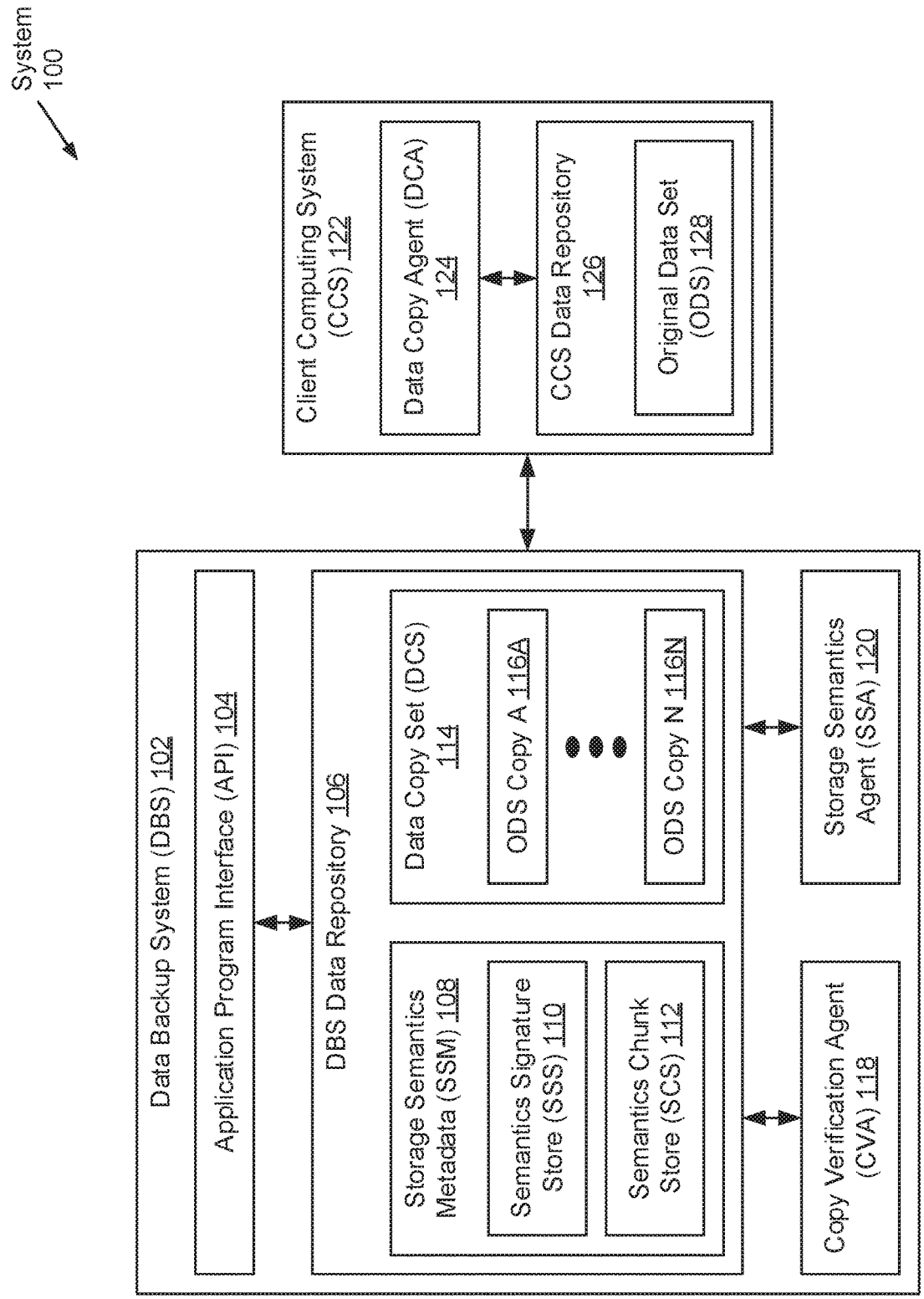
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to the implementation of an automated agent for data copy verification. Specifically, one or more embodiments of the invention entails the execution of an intelligent, machine-learning based method and system for determining the integrity of data copies (i.e., for identifying whether data copies of a same data set have been impacted by malicious activities). Upon determining that data integrity is likely compromised, one or more corrective actions may be triggered. These actions may mitigate the spread of corruption and/or infection.

In one embodiment of the invention, the integrity of a data copy may be compromised as a result of various causes. By way of an example, data integrity may be compromised by the unauthorized modification of data (e.g., a data copy) induced by a cyber security threat or attack. A cyber security threat/attack may be a malicious computer program that targets, and subsequently, exploits one or more vulnerabilities on a computing system (i.e., the computing system whereon the original data associated with the data copy resides, or whereon the data copy was generated). Examples of cyber security threats/attacks include, but are not limited to including: malware, phishing attacks, password attacks, denial-of-service (DOS) attacks, man-in-the-middle (MITM) attacks, structured query language (SQL) injection attacks, cross-site scripting (XSS) attacks, session hijacking attacks, spear-phishing attacks, network probing attacks, brute-force cracking attacks, drive-by-download attacks, advanced persistent threat (APT) attacks, and ransomware.

In one embodiment of the invention, a vulnerability on a computing system may be a flaw or weakness in system design, implementation, operation, internal controls, or management that could be exploited (either accidentally or intentionally). Further, exploitation of a vulnerability may result in a security breach of the computing system, which may lead to, for example, data loss, exposure of sensitive data, lack of accountability, denial of access, data corruption, system hijacking and/or impersonation, and other undesirable outcomes.

FIG. 1 shows a system in accordance with one or more embodiments of the invention. The system (100) includes a data backup system (DBS) (102) operatively connected to a client computing system (CCS) (122). Each of these components is described below.

In one embodiment of the invention, the aforementioned components may be directly or indirectly connected to one another through a network (e.g., a local area network (LAN), a wide area network (WAN) such as the Internet, a mobile network, or any other network). The network (not shown) may be implemented using any combination of wired and/or wireless connections. In embodiments in which the aforementioned components are indirectly connected, there may be other networking components or systems (e.g., switches, routers, gateways, etc.) that facilitate communication and/or information exchange. Further, the aforementioned components may communicate with one another using any combination of wired and/or wireless communication protocols.

In one embodiment of the invention, the DBS (102) may be a data consolidation platform that services one or more CCSs (122). The data consolidated on the DBS (102) may be pertinent to, for example, data backup operations, data archiving operations, and/or disaster recovery operations. Further, the DBS (102) may be implemented on one or more servers (not shown). Each server may be a physical server (i.e., in a datacenter) or a virtual server (i.e., that may be cloud-based). In one embodiment of the invention, the DBS (102) may be implemented on one or more computing systems similar to the exemplary computing system shown in FIG. 7. Moreover, the DBS (102) may be any set of computing systems that may be programmed to receive requests, process requests, and based on the processing of requests, extend services and/or resources to one or more CCSs (122).

In one embodiment of the invention, the DBS (102) may include an application program interface (API) (104), a DBS data repository (106), a copy verification agent (CVA) (118), and a storage semantics agent (SSA) (120). Each of these components is described below.

In one embodiment of the invention, the API (104) may be a hardware and/or software implemented construct that employs a set of subroutine definitions, protocols, and/or tools for structuring information exchange between the DBS (102) and a CCS (122). For example, the API (104) may establish that the exchange of information may entail a request for processing, and a return of a response, if any, based on the outcome of the processing. In one embodiment of the invention, the API (104) may be a web API accessed through an assigned web address (e.g., a uniform resource locator (URL)) and a WAN (e.g., Internet) connection.

In one embodiment of the invention, the DBS data repository (106) may be a storage system or medium for consolidating various forms of data. The DBS data repository (106) may be implemented using any type of storage unit and/or device (e.g., a filesystem, a database, a collection of tables, or any other storage mechanism). Further, the DBS data repository (106) may be implemented using multiple storage units and/or devices, which may or may not be of the same type or located at the same physical site. In one embodiment of the invention, the DBS data repository (106) may be implemented using persistent (i.e., non-volatile) storage media. Examples of the persistent storage media include, but are not limited to, optical storage, magnetic storage, NAND Flash Memory, NOR Flash Memory, Magnetic Random Access Memory (M-RAM), Spin-Torque Magnetic RAM (ST-MRAM), Phase Change Memory (PCM), or any other storage media defined as non-volatile Storage Class Memory (SCM).

In one embodiment of the invention, the DBS data repository (106) may be configured to store storage semantics metadata (SSM) (108). SSM (108) may refer to data that describes data copies (i.e., ODS copies (116A-116N)) that have undergone data deduplication. Further, SSM (108) may be segmented into one of two stores: (1) a semantics signature store (SSS) (110), and (2) a semantics chunk store (SCS) (112). Each of these components is described below.

In one embodiment of the invention, the SSS (110) may be a repository for consolidating mappings relating signature indices to digital signatures, and subsequently, to chunk indices. The SSS (110) is described is further detail below with respect to FIG. 2B. Further, in one embodiment of the invention, the SCS (112) may be a repository for consolidating mappings relating chunk indices to data chunks. The SCS (112) is described in further detail below with respect to FIG. 2C.

In one embodiment of the invention, the DBS data repository (106) may be further configured to store one or more data copy sets (DCSs) (114). A DCS (114) may be a collection of one or more ODS copies (116A-116N). Further, each ODS copy (116A-116N) may be an exact copy of an associated ODS (128) for a given time. Subsequently, each ODS copy (116A-116N) may include exact copies of one or more data objects representing the associated ODS (128) for a given time. In general, a data object may refer to any computer readable information encoded in any computer readable format. Examples of data objects include, but are not limited to, image files, audio files, video files, multimedia files, binary files, computer instructions, executables (i.e., computer programs/processes), archive files, text files, disk volumes, and disk logical unit numbers (LUNs).

One of ordinary skill will appreciate that the DBS data repository (106) may consolidate other information without departing from the scope of the invention.

In one embodiment of the invention, the CVA (118) may be a computer program, or a computer process (i.e., an instance of a computer program), executing on the underlying hardware of the DBS (102). In another embodiment of the invention, the CVA (118) may be a computer program or process executing on the underlying hardware of another computing system (e.g., the CCS (122), etc.) external, however, operatively connected, to the DBS (102). In the latter embodiment, the CVA (118) may subsequently service multiple DBSs (102) through one or more APIs (104) between the CVA (118) and one or more DBSs (102). Further, the CVA (118) may be a computer program or process tasked with the verification of data copies (i.e., ODS copies (116A-116N)) in accordance with embodiments of the invention (see e.g., FIGS. 6A and 6B). Towards verifying data copies, the CVA (118) may include further functionality to optimize deep learning models (DLMs) (see e.g., FIGS. 5A and 5B) in accordance with embodiments of the invention. The CVA (118) is described in further detail below with respect to FIG. 3.

In one embodiment of the invention, the SSA (120) may be a computer program, or a computer process (i.e., an instance of a computer program), executing on the underlying hardware of the DBS (102). Specifically, the SSA (120) may be a computer program or process tasked with implementing data deduplication on the DBS (102). More specifically, the SSA (120) may include functionality, for each DCS (114) stored in the DBS data repository (106), to: (i) subject the DCS (114) (i.e., including one or more ODS copies (116A-116N)) through one or more existing or future developed data deduplication algorithms; (ii) based on the subjecting, obtain (a) zero or more new unique (i.e., not previously catalogued) data chunks specified in the DCS (114), and (b) one or more signatures (i.e., new and/or previously catalogued) representing the raw data (i.e., binary information) specified in the DCS (114); (iii) update the SCS (112) using at least the aforementioned zero or more unique data chunks, as well as update the SSS (110) using at least one or more new signatures corresponding to the aforementioned one or more new unique data chunks; and (iv) replace the raw data specified in each ODS copy (116A-116N) of the DCS (114) with references (i.e., signature indices (see e.g., FIG. 2A)) to a set of signatures that represent the raw data.

In one embodiment of the invention, the CCS (122) may be any computing system (see e.g., FIG. 7) that employs the DBS (102) for data consolidation purposes. Specifically, the CCS (122) may be any computing system used for various applications. These applications may, for example, require large-scale and complex data processing. In one embodiment of the invention, the CCS (122) may be any computing system that may service multiple users concurrently. Moreover, the CCS (122) may be programmed to provide and manage the allocation of computing resources (e.g., computer processors, memory, persistent and non-persistent storage, network bandwidth, etc.) towards the execution of various processes (i.e., tasks) that may be instantiated by one or more users thereon. Examples of the CCS (122) include, but are not limited to including, one or more: desktop computers, laptop computers, smartphones, tablet computers, gaming consoles, servers, mainframes, virtual machines, or any combination thereof.

In one embodiment of the invention, the CCS (122) may include a data copy agent (DCA) (124) and a CCS data repository (126). Each of these components is described below.

In one embodiment of the invention, the DCA (124) may be a computer program, or a computer process (i.e., an instance of a computer program), executing on the underlying hardware of the CCS (122). Specifically, the DCA (124) may be a computer program or process tasked with replicating, or generating copies of, one or more original data sets (ODSs) (128) (described below). ODS (128) replication may entail producing an exact copy of the ODS (128)—i.e., an ODS copy (116A-116N)—using any existing or future developed data replication algorithm. The DCA (124) may include further functionality to submit requests to the DBS (102) including at least any generated ODS copies (116A-116N). The submitted requests may pertain to storing the ODS copies (116A-116N) as part of a variety of operations, which include, but are not limited to, data backup operations, data archiving operations, and disaster recovery operations.

In one embodiment of the invention, the CCS data repository (126) may be a storage system or medium for consolidating various forms of data. The CCS data repository (126) may be implemented using any type of storage unit and/or device (e.g., a filesystem, a database, a collection of tables, or any other storage mechanism). Further, the CCS data repository (126) may be implemented using multiple storage units and/or devices, which may or may not be of the same type or located at the same physical site. In one embodiment of the invention, the data repository (126) may be implemented using persistent (i.e., non-volatile) storage media. Examples of storage media include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as a non-volatile Storage Class Memory (SCM).

In one embodiment of the invention, the CCS data repository (126) may be configured to store one or more original data sets (ODSs) (126). A or each ODS (126) may be a collection of one or more data objects that have been generated, used, or otherwise reside on the CCS (122). In general, a data object may refer to any computer readable information encoded in any computer readable format. Examples of data objects include, but are not limited to, image files, audio files, video files, multimedia files, binary files, computer instructions, executables (i.e., computer programs/processes), text files, disk volumes, and disk logical unit numbers (LUNs).

One of ordinary skill will appreciate that the CSS data repository (126) may consolidate other information without departing from the scope of the invention.

While FIG. 1 shows a configuration of components, other system configurations may be used without departing from the scope of the invention. For example, the system (100) may include multiple (i.e., more than one) CCSs (122) may be operatively connected, and thus employ, the DBS (102). By way of another example, the system (100) may include an additional storage system (not shown) operatively connected to the DBS (102) and used, by the DBS (102), for consolidating verified data copies (i.e., verified ODS copies (116A-116N)). By way of yet another example, the system (100) may include an inspection computing system (ICC) (not shown) operatively connected to the DBS (102), and used by operators (e.g., data integrity and/or cyber security professionals) to perform human intervening inspections on a select set of data copies submitted by the CVA (118).

Figure 2A:
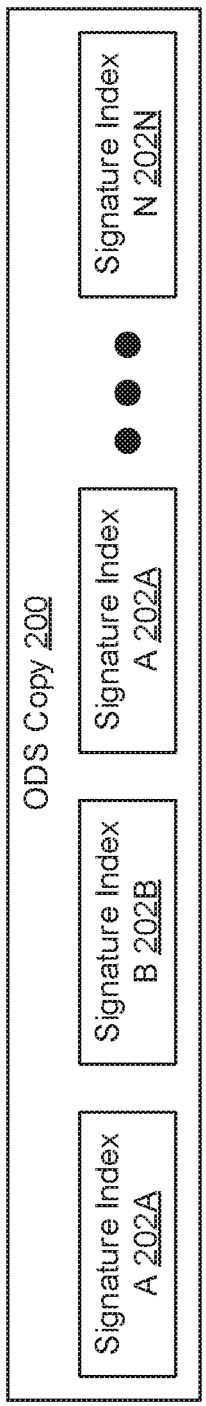
FIG. 2A shows an original data set copy in accordance with one or more embodiments of the invention.

FIG. 2A shows an original data set (ODS) copy in accordance with one or more embodiments of the invention. As described above, an ODS copy (200) may be an exact copy of an ODS (126) associated with a given time. Subsequently, in one embodiment of the invention, prior to being subjected to data deduplication, the ODS copy (200) may include raw data (i.e., binary information) pertaining to a collection of one or more replicated data objects (i.e., exact copies of one or more data objects that had resided on a CCS (see e.g., FIG. 1) at the given time). However, after data deduplication performed by the storage semantics agent (SSA) (see e.g., FIG. 1), the ODS copy (200) may be represented through a set of one or more signature indices (202A-202N). Each signature index (202A-202N) may be a referencing object that contains a memory address to a semantics signature store (SSS) entry (212A-212N) consolidated in the SSS (210) (see e.g., FIG. 2B). Subsequently, each signature index (202A-202N) maps to a unique data chunk (224) consolidated in the semantics chunk store (SCS) (220) (see e.g., FIG. 2C).

Figure 2B:
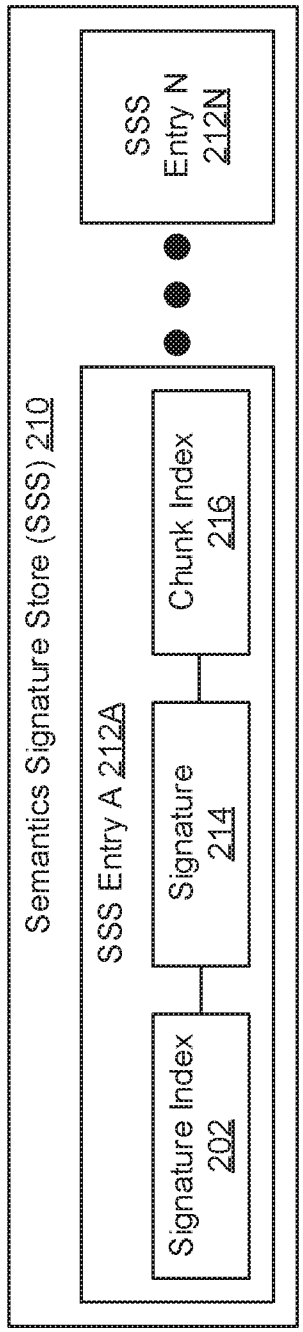
FIG. 2B shows a semantics signature store in accordance with one or more embodiments of the invention.

FIG. 2B shows a semantics signature store (SSS) in accordance with one or more embodiments of the invention. The SSS (210) may be a repository that consolidates and maintains one or more SSS entries (212A-212N). Each SSS entry (212A-212N) may store a mapping relating a signature index (202) (described above) to a digital signature (214), and subsequently, to a chunk index (216). Furthermore, the SSS (210) may be programmed by the SSA (see e.g., FIG. 1) during data deduplication operations.

In one embodiment of the invention, a digital signature (214), or fingerprint, may be a bit string that uniquely identifies a data chunk (224) (described below). The digital signature (214) may be generated by subjecting the corresponding data chunk (224) through a hashing function (not shown). The hashing function may employ any combination of existing or future developed cryptographic algorithms. Subsequently, the digital signature (214) may be a hash value, a hash code, or a digest outputted by the hashing function given the corresponding data chunk (224) as input. Further, the digital signature (214) may be of any specified length, though typically, the digital signature (214) may be substantially smaller in size than the data chunk (224) to which the digital signature (214) corresponds. By way of an example, each digital signature (214) may be 20 bytes long. In one embodiment of the invention, the chunk index (216) may be a referencing object that contains a memory address to a semantics chunk store (SCS) entry (222A-222N) consolidated in the SCS (220) (see e.g., FIG. 2C).

Figure 2C:
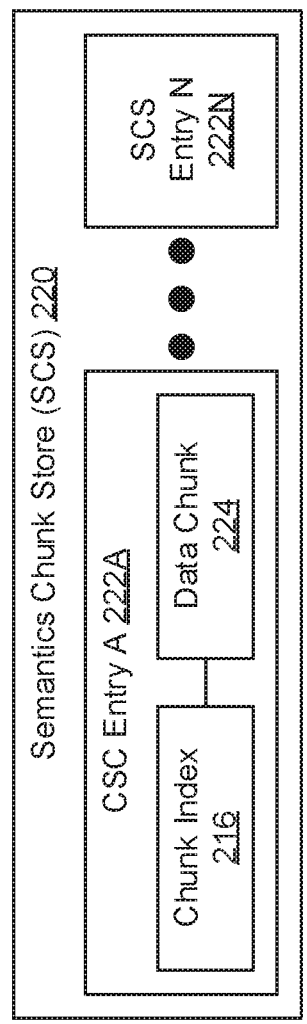
FIG. 2C shows a semantics chunk store in accordance with one or more embodiments of the invention.

FIG. 2C shows a semantics chunk store (SCS) in accordance with one or more embodiments of the invention. The SCS (220) may be repository that consolidates and maintains one or more SCS entries (222A-222N). Each SCS entry (222A-222N) may store a mapping relating a chunk index (216) (described above) to a data chunk (224). Furthermore, the SCS (220) may be programmed by the SSA (see e.g., FIG. 1) during data deduplication operations.

In one embodiment of the invention, a data chunk (224) may be a fragment of any raw data (i.e., a binary information fragment) specified in a data object. Further, the data chunk (224) may be a unique bit or byte pattern that may or may not be identified repeatedly (i.e., more than once) throughout a data copy set (DCS) (see e.g., FIG. 1), and thus, throughout one or more data objects. In one embodiment of the invention, the size of each data chunk (224) may be determined by the data deduplication algorithm applied during data deduplication operations, and may be specified in, for example, kilobytes (KB) or megabytes (MB).

Figure 3:
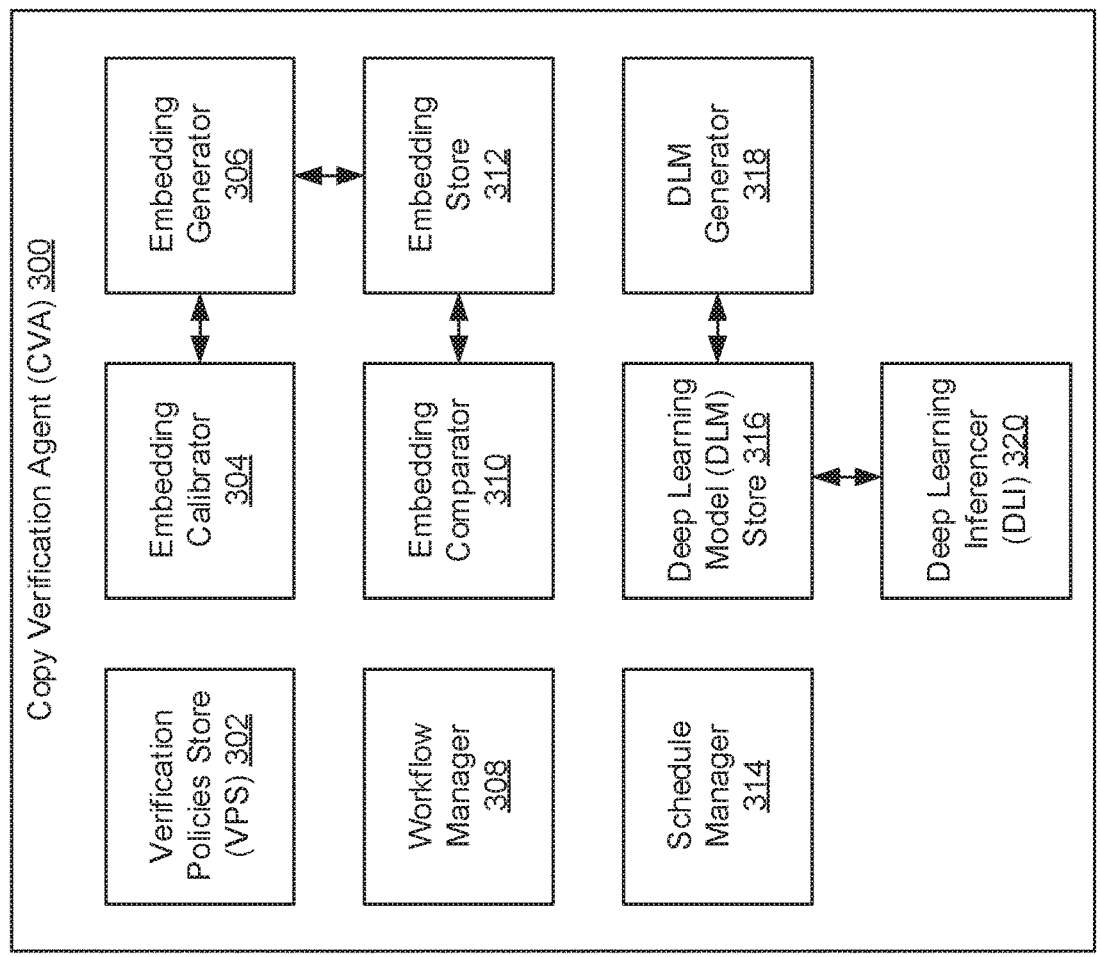
FIG. 3 shows a copy verification agent in accordance with one or more embodiments of the invention.

FIG. 3 shows a copy verification agent (CVA) in accordance with one or more embodiments of the invention. As described above, the CVA (300) may be a computer program or process tasked with the verification of data copies. Towards achieving this objective, the CVA (300) may include a verification policies store (VPS) (302), an embedding calibrator (304), an embedding generator (306), a workflow manager (308), an embedding comparator (310), an embedding store (312), a schedule manager (314), a deep learning model (DLM) store (316), a DLM generator (318), and a deep learning inferencer (DLI) (320). Each of these components is described below.

In one embodiment of the invention, the VPS (302) may be a data repository dedicated for the consolidation of one or more verification policies (not shown). Each verification policy may be associated with (or may correspond to) one data copy set (DCS) (see e.g., FIG. 1). Accordingly, a verification policy may be a set of rules and/or constraints that tailor the data copy verification process (see e.g., FIGS. 6A and 6B), which the CVA (300) is programmed to perform, to the DCS to which the verification policy is associated. Again, the data copy verification process generally entails verifying the one or more original data set (ODS) copies (see e.g., FIG. 1) of a DCS. Verification policies are described in further detail below with respect to FIG. 4.

In one embodiment of the invention, the embedding calibrator (304) may be a computer process (i.e., an instance of a computer program, or the CVA (300)) that executes on the underlying hardware of the data backup system (DBS) (see e.g., FIG. 1). In another embodiment of the invention, the embedding calibrator (304) may be a computer process that executes on the underlying hardware of a computing system external, however, operatively connected, to the DBS. Specifically, the embedding calibrator (304) may be a computer process tasked with calibrating similarity measures between pairs of copy embeddings (described below) to generate a similarity measure threshold (SMT). A similarity measure may be a measure of the alikeness of two copy embeddings. Further, the SMT may be a limit defining an accepted tolerance of dissimilarity amongst data copies (i.e., ODS copies) of an associated DCS. Said another way, the SMT may be a limit defining an acceptable tolerance for the extent of data infection/corruption, if any, present across the data copies of the DCS. Moreover, the embedding calibrator (304) may include functionality to perform the various steps towards generating the SMT as described in U.S. patent application Ser. No. 15/799,088.

In one embodiment of the invention, the embedding generator (306) may be a computer process (i.e., an instance of a computer program, or the CVA (300)) that executes on the underlying hardware of the DBS (see e.g., FIG. 1). In another embodiment of the invention, the embedding generator (306) may be a computer process that executes on the underlying hardware of a computing system external, however, operatively connected, to the DBS. Specifically, the embedding generator (306) may be a computer process tasked with generating copy embeddings for data copies (i.e., ODS copies) in/of a DCS, respectively. A copy embedding may be a multi-dimensional vector that encodes the one or more underlying digital signatures, representative of the raw data, specified in a corresponding ODS copy. Furthermore, the embedding generator (306) may include functionality to perform the various steps towards generating one or more copy embeddings as described in U.S. patent application Ser. No. 15/799,088.

In one embodiment of the invention, the workflow manager (308) may be a computer process (i.e., an instance of a computer program, or the CVA (300)) that executes on the underlying hardware of the DBS (see e.g., FIG. 1). In another embodiment of the invention, the workflow manager (308) may be a computer process that executes on the underlying hardware of a computing system external, however, operatively connected, to the DBS. Specifically, the workflow manager (308) may be a computer process tasked with coordinating processes (i.e., tasks) for which one or more components of the CVA (300) may be responsible, to implement the automation of data copy verification. In one embodiment of the invention, the workflow manager (308) may rely on one or more workflows and/or one or more actions, specified in verification policies (see e.g., FIG. 4), to perform the aforementioned coordination of processes.

In one embodiment of the invention, the embedding comparator (310) may be a computer process (i.e., an instance of a computer program, or the CVA (300)) that executes on the underlying hardware of the DBS (see e.g., FIG. 1). In another embodiment of the invention, the embedding comparator (310) may be a computer process that executes on the underlying hardware of a computing system external, however, operatively connected, to the DBS. Specifically, the embedding comparator (310) may be a computer process tasked with generating similarity measures. As described above, a similarity measure may be a measure of the alikeness of two copy embeddings. Further, to generate a similarity measure, the embedding comparator (310) may include functionality to: (i) project the corresponding pair of copy embeddings into a multi-dimensional space, where, for example, a linear or non-linear mapping function may be employed to translate each copy embedding into a higher dimensional coordinate space; and (ii) compute the Euclidean distance (with dimensions representing features of the copy embeddings) between the pair of multi-dimensionally projected copy embeddings. In other embodiments of the invention, other distance definitions may alternatively be employed, which include, but are not limited to, the Chebyshev distance, the Hamming distance, the Mahalanobis distance, the Manhattan distance, and the Minkowski distance. In one or more other embodiments of the invention, the cosine similarity metric, which measures similarity based on the angle between vectors representing the multi-dimensionally projected pair of copy embeddings, may be employed in place of computing a distance.

In one embodiment of the invention, the embedding store (312) may be a data repository dedicated for the consolidation of one or more copy embeddings. Specifically, subsequent to the generation of one or more copy embeddings by the embedding generator (306), the one or more copy embeddings may be stored in the embedding store (312), where the copy embeddings may be accessible to one or more other CVA (300) components (e.g., the embedding comparator (310)) towards achieving their respective functionalities.

In one embodiment of the invention, the schedule manager (314) may be a computer process (i.e., an instance of a computer program, or the CVA (300)) that executes on the underlying hardware of the DBS (see e.g., FIG. 1). In another embodiment of the invention, the schedule manager (314) may be a computer process that executes on the underlying hardware of a computing system external, however, operatively connected, to the DBS. Specifically, the schedule manager (314) may be a computer process tasked with triggering the execution of the verification process (see e.g., FIGS. 6A and 6B) based on a preset execution schedule defined for each DCS residing on the DBS. The execution schedule may be defined by administrators of the DBS, a CCS, or a combination thereof.

In one embodiment of the invention, the DLM store (316) may be a data repository dedicated for the consolidation of one or more DLMs (described below). Specifically, following the generation and/or optimization of one or more DLMs by the DLM generator (318), architectural information pertaining to the DLM(s) may be stored in the DLM store (316). Further, once stored, these architectural information may be accessible to one or more other CVA (300) components (e.g., the DLI (320)) towards achieving their respective functionalities.

In one embodiment of the invention, architectural information may refer to a set of parameters and/or hyper-parameters, defining the DLM, which have been optimized (through supervised learning (described below)) to assure the optimal performance of a function—i.e., ODS copy fragment classification (also described below). A parameter may refer to a configuration variable that is internal to the DLM and whose value may be estimated from data. Examples of a parameter include, but are not limited to: the weights in a neural network, or the support vectors in a support vector machine. In contrast, a hyper-parameter may refer to a configuration variable that is external to the DLM and whose value may not be estimated from data. Examples of a hyper-parameter include, but are not limited to: the learning rate for training a neural network, or the soft margin cost function for a nonlinear support vector machine. Further, architectural information may vary depending on the machine learning paradigm (e.g., neural network, decision tree, support vector machine, etc.) after which the DLM is modeled.

For example, if a DLM follows a neural network design, the architectural information may specify, but may not be limited to specifying: a number of layers, a number of nodes occupying each layer, an interconnectivity configuration between the various nodes, values for weights representative of the strengths of the various inter-nodal connections, propagation functions through which nodal outputs are computed with respect to nodal inputs and/or other parameters (e.g., weights), a specificity of a learning rule governing how the one or more parameters are adjusted to produce desired training results, etc. By way of another example, if a DLM follows a support vector machine design, the architectural information may alternatively specify, but may not be limited to specifying: support vectors defining the hyperplane(s) maximizing the margins between classes, a kernel function for translating low dimensional input data into a higher dimensional space, a penalty value associated with an error term, a specificity of a kernel coefficient used for best-fitting the training data, etc.

In one embodiment of the invention, the DLM generator (318) may be a computer process (i.e., an instance of a computer program, or the CVA (300)) that executes on the underlying hardware of the DBS (see e.g., FIG. 1). In another embodiment of the invention, the DLM generator (318) may be a computer process that executes on the underlying hardware of a computing system external, however, operatively connected, to the DBS. Specifically, the DLM generator (318) may be a computer process tasked with generating a DLM (described below) for a DCS. Towards achieving this objective, the DLM generator (318) may include further functionality to perform various steps directed to optimizing the DLM in accordance with embodiments of the invention (see e.g., FIGS. 5A and 5B).

In one embodiment of the invention, a DLM may be a machine learning paradigm (e.g., a neural network, a decision tree, a support vector machine, etc.), optimized through supervised learning, and tasked with the classification of ODS copy fragments (i.e., data fragments that collectively form an ODS copy). Said another way, the DLM for a DCS may be a classifier of ODS copy fragment (associated with ODS copies of the DCS). Classifications for ODS copy fragments may include, but are not limited to: (a) a valid target class—inferring that the ODS copy fragment may or may not include some data infection or corruption, where the extent of the data infection/corruption, if any, is within acceptable tolerances, and thereby, indicating that the ODS copy fragment contains valid (or verifiable) data; and (b) an invalid target class—inferring that the ODS copy fragment includes data infection/corruption beyond acceptable tolerances, and thereby, indicating that the ODS copy fragment contains invalid (or unverifiable) data. Moreover, in one embodiment of the invention, supervised learning may refer to learning (or optimization) through the analyses of training examples and/or data.

In one embodiment of the invention, the DLI (320) may be a computer process (i.e., an instance of a computer program, or the CVA (300)) that executes on the underlying hardware of the DBS (see e.g., FIG. 1). In another embodiment of the invention, the DLI (320) may be a computer process that executes on the underlying hardware of a computing system external, however, operatively connected, to the DBS. Specifically, the DLI (320) may be a computer process tasked with inferring the classification of ODS copy fragments (for ODS copies associated with a DCS) using the DLM (i.e., classifier) optimized for the DCS. Towards achieving this objective, the DLI (320) may include functionality to perform various steps directed to verifying ODS copies, or more specifically, ODS copy fragments, in accordance with embodiments of the invention (see e.g., FIGS. 6A and 6B).

Figure 4:
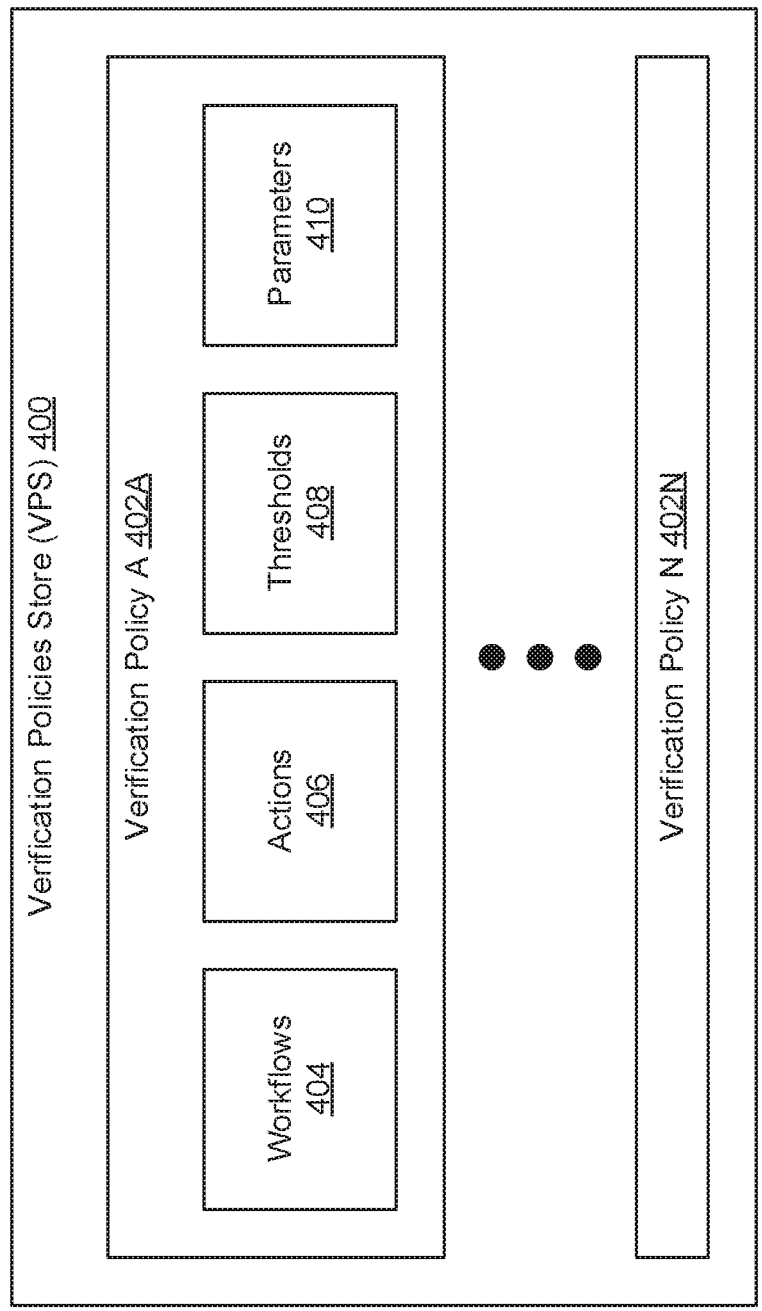
FIG. 4 shows a verification policies store in accordance with one or more embodiments of the invention.

FIG. 4 shows a verification policies store (VPS) in accordance with one or more embodiments of the invention. As described above, the VPS (400) may be a data repository dedicated for the consolidation of one or more verification policies (402A-402N). Each verification policy (402A-402N) may be associated with one data copy set (DCS) (see e.g., FIG. 1); and subsequently, may represent a set of rules and/or constraints that tailor the data copy verification process (see e.g., FIGS. 6A and 6B), performed by the CVA (see e.g., FIG. 3), to the one DCS. Further, each verification policy (402A-402N) may be represented through one or more workflows (404), actions (406), thresholds (408), and/or parameters (410). Each of these components is described below.

In one embodiment of the invention, a workflow (404) may be a policy, represented through one or more conditions, which when violated, triggers one or more actions (406) defined in the verification policy (402A-402N). The condition(s) may pertain to any circumstance entailing the DCS and/or the verification process. By way of an example, a workflow (404) may specify that, for the DCS with which the verification policy (402A-402N) is associated, one or more actions (406) (described below) are to be executed should an original data set (ODS) copy, or ODS copy fragment, corresponding to the DCS be deemed unverifiable (i.e., fails the verification process).

In one embodiment of the invention, an action (406) may be an event or process that is invoked upon the fulfillment of a workflow (404) condition (described above). Substantively, one or more actions may be specified under a single workflow (404). Alternatively, a same set of one or more actions may be specified under multiple, different workflows (404). Examples of actions (406) include, but are not limited to including: (i) the issuance of a notification, to appropriate parties, relaying at least the workflow (404) condition(s) that had been fulfilled; (ii) the marking of one or more vetted (i.e., already verified) ODS copies, in/of an associated DCS, as immutable—thereby locking the state or data of the vetted ODS copies so that their state/data can no longer be modified; (iii) the replication and transfer of one or more vetted ODS copies, in/of an associated DCS, to an additional storage system operatively connected to a data backup system (DBS) (see e.g., FIG. 1); (iv) the submission of one or more infected/compromised ODS copies, in/of an associated DCS, for additional, more intensive data integrity evaluations; (v) the deactivation of the DBS on which one or more infected/compromised ODS copies, in/of an associated DCS, resides; and (vi) the disabling of one or more network interfaces of the DBS on which one or more infected/compromised ODS copies, in/of an associated DCS, resides. Further, with respect to the latter two action (406) examples, deactivation of the DBS, and/or the disabling of network interfaces residing on the DBS, may quarantine the DBS, thereby, preventing the spread of data infection/corruption to other networked components.

In one embodiment of the invention, a threshold (408) may be a predefined amount, level, or limit for a quantifiable property (or metric) of the DCS with which the verification policy (402A-402N) is associated. Alternatively, a threshold (408) may be a predefined amount, level, or limit for a quantifiable property (or metric) pertinent to any operation of the deep learning model (DLM) optimization process (see e.g., FIGS. 5A and 5B) and/or the data copy verification process (see e.g., FIGS. 6A and 6B). Accordingly, a threshold (408) may be represented through, for example, a maximum value, a minimum value, or one or more ranges of values. In one embodiment of the invention, a quantifiable property (or metric) may be or relate to a parameter (410) defined in the verification policy (402A-402N). Further, upon the meeting/reaching, exceeding, shortfall, residing within, or residing outside of a threshold (408), one or more events may transpire. These events may include, but are not limited to: the adjustment of one or more DLM parameters and/or hyper-parameters (discussed above) (see e.g., FIG. 3); the designation of an ODS copy, in/of an associated DCS, as a verified (or alternatively, unverifiable) object; and the termination of DLM optimization, and subsequently, the storage of DLM architectural information optimized through supervised learning.

In one embodiment of the invention, a parameter (410) may be a numerical or other measurable factor that defines an operation of the DLM optimization and/or data copy verification process(es). Examples of parameters (410) include, but are not limited to, DLM parameters (i.e., configuration variables that are internal to the DLM and whose values may be estimated from data) and DLM hyper-parameters (i.e., configuration variables that are external to the DLM and whose values may not be estimated from data, but rather from administrators or heuristics).

Figure 5A:
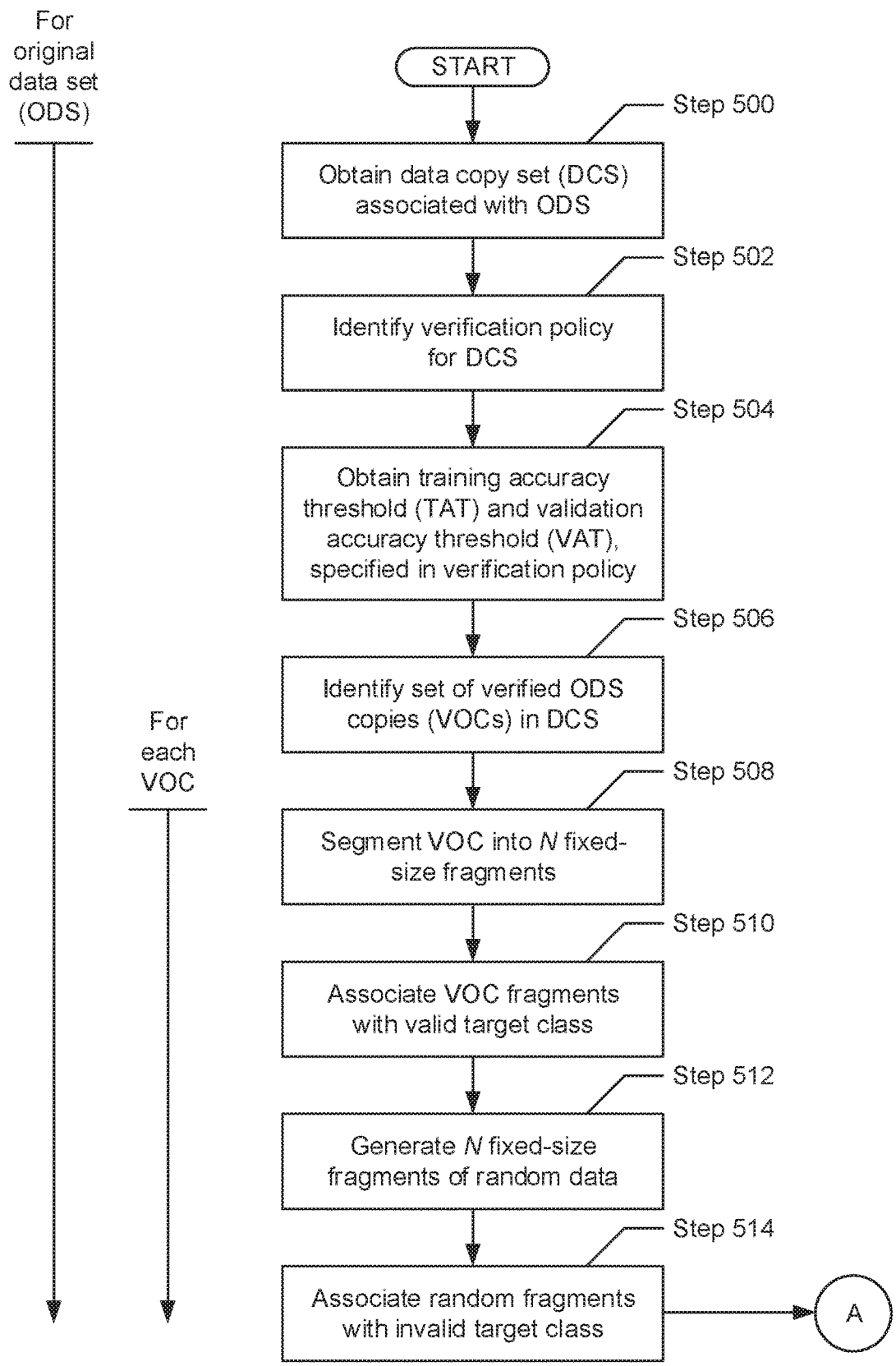
FIGS. 5A and 5B show flowcharts describing a method for optimizing a deep learning model in accordance with one or more embodiments of the invention.
Figure 5B:
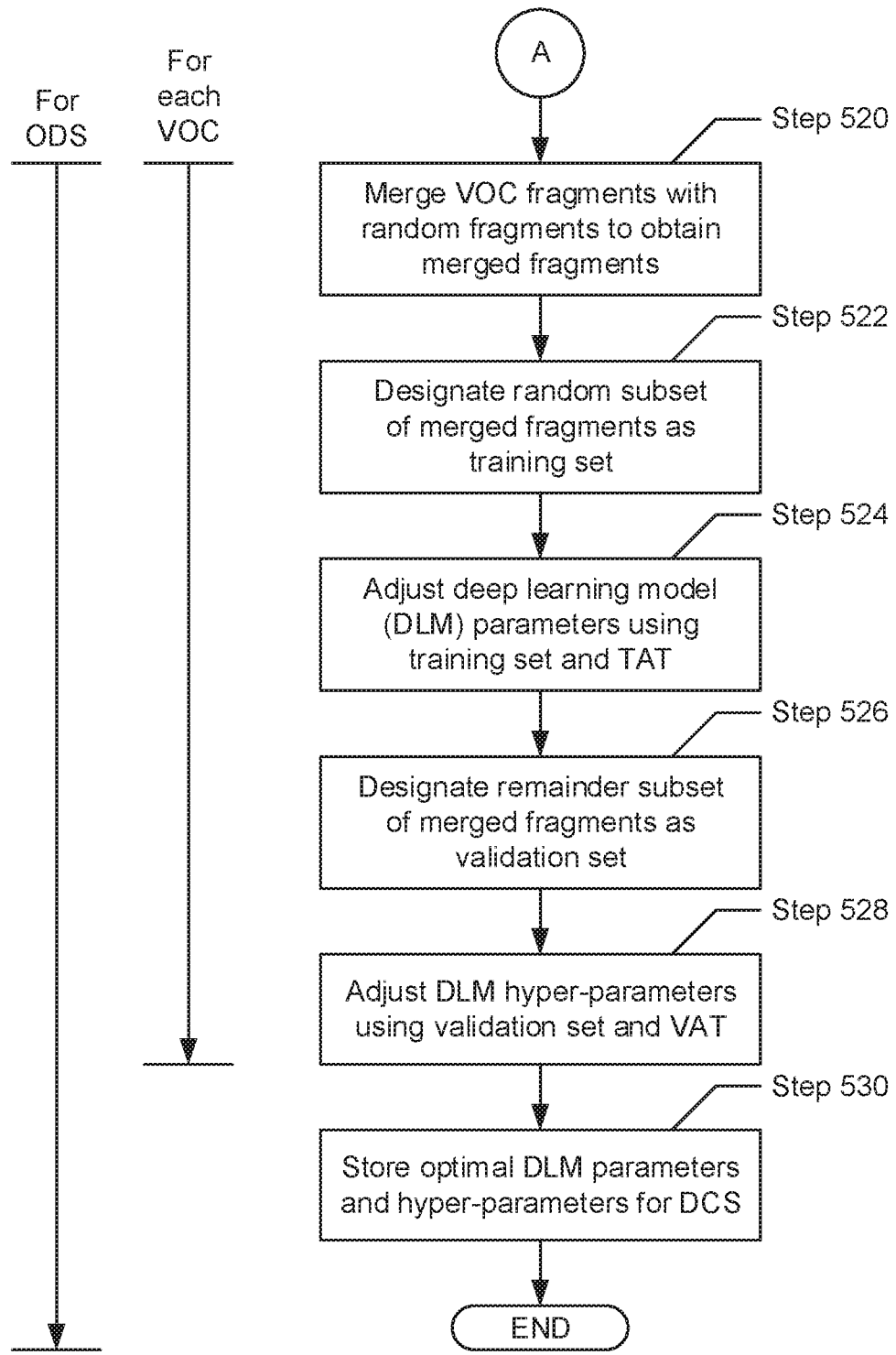

FIGS. 5A and 5B show flowcharts describing a method for optimizing a deep learning model (DLM) in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 5A and 5B may be performed in parallel with any other steps shown in FIGS. 6A and 6B without departing from the scope of the invention.

As mentioned above, in one embodiment of the invention, a DLM may be any machine learning paradigm (e.g., a neural network, a decision tree, a support vector machine, etc.) that may be employed as a data classifier. Further, with respect to optimization, the DLM may undergo supervised learning, which may entail learning to correctly predict data copy classifications through the analyses of training examples and/or data. FIGS. 5A and 5B substantively detail various steps towards identifying an optimal DLM architecture, encompassing an optimal set of DLM parameters and hyper-parameters (described above), for best-predicting classifications for data copy fragments (i.e., original data set (ODS) copy fragments) associated with a particular data copy set (DCS).

Turning to FIG. 5A, in Step 500, for an original data set (ODS) (see e.g., FIG. 1), the data set copy (DCS) associated with the ODS is obtained. In one embodiment of the invention, the DCS may include a set of at least two ODS copies. Further, each ODS copy may be an exact copy of the ODS for a given time. The DCS may reside in a data repository on a data backup system (DBS) (see e.g., FIG. 1), and subsequently, may be retrieved therefrom.

In Step 502, the verification policy specific to the DCS (obtained in Step 500) is identified. In one embodiment of the invention, the verification policy may represent a set of rules and/or constraints that tailor the process of data copy verification, in accordance with embodiments of the invention, to the DCS. Further, the set of rules and/or constraints may take form as one or more workflows, actions, thresholds, and/or parameters (described above) (see e.g., FIG. 4). Moreover, identification of the verification policy may, for example, entail matching a verification policy identifier specified in records tied to the DCS (e.g., maintained by a data backup system (DBS) on which the DCS resides) and uniquely assigned to the verification policy.

In Step 504, a training accuracy threshold (TAT) and a validation accuracy threshold (VAT) are obtained. Specifically, the TAT and the VAT may be specified in, and thus, retrieved from, the verification policy (identified in Step 502). In one embodiment of the invention, the TAT may refer to a goal classification accuracy (or percentage of correct predictions) to be achieved by the DLM during the optimization of DLM parameters (described above). Optimization of DLM parameters may be performed during a training phase for the DLM while undergoing supervised learning. On the other hand, the VAT may refer to a goal classification accuracy (or percentage of correct predictions) to be achieved by the DLM during the optimization of DLM hyper-parameters (described above). Optimization of DLM hyper-parameters may be performed during a validating phase for the DLM while undergoing supervised learning.

In Step 506, a set of one or more verified ODS copies (VOCs), pertaining to the DCS (obtained in Step 500), is identified. In one embodiment of the invention, a VOC may refer to an ODS copy that has been previously vetted (i.e., marked as verified) by way of the data copy verification process disclosed herein (see e.g., FIGS. 6A and 6B). In another embodiment of the invention, a VOC may refer to an ODS copy that additionally, or alternatively, has been previously vetted through an embedding-based data copy verification process, which is described in U.S. patent application Ser. No. 15/799,088. Substantively, when assessing a Nth ODS copy (i.e., an ODS copy associated with the Nth earliest given time or creation date), the set of VOCs may include one or more ODS copies (up to the (N−1)th ODS copy), which have been granted a verified designation through either, or both, of the aforementioned data verification processes.

Hereinafter, Steps 508 through 528—signifying a training/validation iteration—may be repeated multiple times based on the number of VOCs (identified in Step 506). Said another way, a training/validation iteration may elapse for each identified VOC in/of the associated DCS (obtained in Step 500). Further, at the conclusion of each training/validation iteration, final values for each DLM parameter and hyper-parameter may be obtained as a result of an optimization goal being met (described below). When additional training/validation iterations remain (i.e., additional VOCs (identified in Step 506) are awaiting processing), these final DLM parameter and hyper-parameter values may be carried over into the subsequent training/validation iteration, where the DLM parameters and hyper-parameters are further adjusted until the optimization goal for the subsequent training/validation iteration is also met. Thereafter, only when no additional training/validation iterations remain (i.e., each and every VOC (identified in Step 506) has been processed), then the final DLM parameter and hyper-parameter values, obtained for the last training/validation iteration, may be recognized as the optimal set of DLM parameters and hyper-parameters (obtained through supervised learning) for the DCS.

With that said, in Step 508, for each VOC (identified in Step 506), the VOC is segmented. Specifically, in one embodiment of the invention, the VOC may be segmented into multiple fixed-size fragments. Each VOC fragment may, for example, be one-byte long; however, one of ordinary skill will appreciate that the size of each VOC fragment may be any other specified length with the caveat that the size of each VOC fragment is the same as any other VOC fragment of the VOC.

In Step 510, each VOC fragment (obtained in Step 508) of a/the VOC is designated a same classification. Particularly, in one embodiment of the invention, each VOC fragment may be associated with a valid target class. The valid target class may refer to a set of objects (e.g., VOC fragments) having data that is verified (i.e., having data that may or may not include some data infection or corruption, where the extent of the data infection/corruption, if any, is within acceptable tolerances). Further, associating each VOC fragment with the valid target class may entail generating a tuple including two elements: (a) the raw data contained in the VOC fragment; and (b) a categorical variable, which may be expressed in a numerical value (e.g., "1"), for representing the valid target class. Each of these aforementioned tuples may be disclosed hereafter as a valid data tuple.

In Step 512, for each VOC (identified in Step 506), a number of random fragments is generated. In one embodiment of the invention, the number of random fragments generated matches the number of VOC fragments obtained through segmentation of the VOC (in Step 508). For example, if a VOC had been segmented into ten fixed-size VOC fragments, then ten fixed-size random fragments would be generated. Further, the size of each random fragment may match the specified fixed-size of each VOC fragment. Summarily, each random fragment may, for example, be 1024 bytes (or 1 kilo-byte) long; however, one of ordinary skill will appreciate that the size of each random fragment may be any other specified length with the caveat that the size of each random fragment is the same as any other random fragment, as well as the same as any VOC fragment of the VOC. Moreover, in one embodiment of the invention, each random fragment may include random raw data obtained through any existing random data generation algorithm.

In Step 514, each random fragment of the number of random fragments (generated in Step 512) is designated another same classification. Specifically, in one embodiment of the invention, each random fragment may be associated with an invalid target class. The invalid target class may refer to a set of objects (e.g., random fragments) having data that is unverifiable (i.e., having data that exhibits data infection/corruption beyond acceptable tolerances). Further, associating each random fragment with the invalid target class may entail generating a tuple including two elements: (a) the raw data contained in the random fragment; and (b) a categorical variable, which may be expressed in a numerical value (e.g., "0"), for representing the invalid target class. Each of these aforementioned tuples may be disclosed hereafter as an invalid data tuple.

In one embodiment of the invention, other fragment sets that may be associated with like or different target classes, respectively, may be employed additionally or alternatively. For example, a number of fixed-size infected fragments may be segmented from ODS copies (in/of the DCS) that are known to be infected or corrupted by one or more cyber security threats/attacks (e.g., malware, ransomware, etc.). Further, each infected fragment of the number of infected fragments may be associated with the invalid target class, or alternatively, another target class entirely (i.e., though not the valid target class). By way of another example, a number of fixed-size encrypted fragments may be segmented from an encrypted version of each VOC (identified in Step 506). That is, each VOC may first be encrypted using any existing cryptographic algorithm, and subsequently, segmented to obtain the encrypted fragments. Thereafter, each encrypted fragment of the number of encrypted fragments may be associated with the valid target class, or alternatively, another target class altogether (i.e., though not the invalid target class). By way of yet another example, a number of sampled fragments may be segmented from one or more other ODS copies (in/of the DCS), which may or may not have already undergone verification. Subsequently, each sampled fragment of the number of sampled fragments may be associated with the valid target class, the invalid target class, or another target class entirely. In one embodiment of the invention, these additional or alternative fragment sets (and target classes) may be employed to diversify the training and/or validation sets (described below) through which DLM parameters and hyper-parameters may be adjusted. In diversifying the training and/or validation sets, the DLM may become a more robust classifier.

Turning to FIG. 5B, in Step 520, for each VOC (identified in Step 506), the set of valid data tuples (generated in Step 510) are merged with the set of invalid data tuples (generated in Step 514), thereby obtaining a superset of tuples—i.e., to be designated as merged fragments. In one embodiment of the invention, the set of merged fragments may be a superset that includes the union of (or all elements specified in) the set of valid data tuples and the set of invalid data tuples. For example, assume the set of valid data tuples includes three tuples—e.g., {(data[0],"1"), (data[1],"1"), (data[2],"1")}—and the set of invalid data tuples, by definition, also includes three tuples—e.g., {(data[3],"0"), (data[4],"0"), (data[5],"0")}—where data[n] represents raw data of a fixed-size contained in three VOC fragments and three random fragments, respectively. Following this example, the obtained set of merged fragments thus includes all six tuples—i.e., {(data[0],"1"), (data[1],"1"), (data [2],"1"), (data[3],"0"), (data[4],"0"), (data[5],"0")}.

In Step 522, for each VOC (identified in Step 506), a training set of one or more valid and/or invalid data tuples is created. Specifically, in one embodiment of the invention, a subset of the set of merged fragments (obtained in Step 520) may be randomly selected to create the training set. Further, the cardinality of the subset of merged fragments (i.e., the number of tuples selected) may be determined based on a parameter—e.g., a Percentage of Data for Training (PDT) parameter—specified in the verification policy (identified in Step 502), and retrieved prior to Step 522. In one embodiment of the invention, a PDT parameter may be a numerical factor specifying the percentage of an input dataset (e.g., the set of merged fragments) to be used for optimizing DLM parameters. Optimization of DLM parameters may be performed during a training phase for the DLM while undergoing supervised learning. Following the above-mentioned example, had the PDT parameter specified a two-thirds (or approximately 67%) value, four of the six tuples specified in the set of merged fragments would be randomly selected to create the training set.

In Step 524, one or more DLM parameters are adjusted using the training set (created in Step 522) and the TAT (obtained in Step 504). In one embodiment of the invention, a DLM parameter may refer to a configuration variable that is internal to the DLM and whose value may be estimated from data. Examples of a DLM parameter include, but are not limited to: the weights in a neural network, or the support vectors in a support vector machine.

In one embodiment of the invention, adjustment of the DLM parameter(s) may entail, at least until a measured classification accuracy meets or exceeds the TAT: (i) feeding the first element of each tuple specified in the training set (i.e., the raw data contained in the VOC and/or random fragments selected into the training set)—designated as input data—through the DLM; (ii) obtaining, based on manipulation of the input data by current architectural information (described above) defining the DLM, class predictions for each tuple specified in the training set (i.e., class predictions for each VOC and/or random fragment selected into the training set)—designated as actual output data; (iii) comparing the actual output data against the second element of each tuple specified in the training set (i.e., the categorical variable indicative of the target class—e.g., a valid target class or an invalid target class—for each VOC and/or random fragment selected into the training set)—designated as desired output data; (iv) computing a measured classification accuracy based on the comparison of actual and desired output data performed in (iii); (v) in the observance of a measured classification accuracy below the TAT, quantifying any errors or differences between the actual and desired output data; and finally, (vi) adjusting one or more DLM parameters with the optimization goal of minimizing the errors quantified in (v) so that the actual output data near-matches, if not matches, the desired output data.

In Step 526, for each VOC (identified in Step 506), a validation set of one or more valid and/or invalid data tuples is created. Specifically, in one embodiment of the invention, a remainder subset of the set of merged fragments (obtained in Step 520) may be selected to create the validation set. Said another way, the remaining one or more tuples, not selected into the training set (created in Step 522), may be assigned into the validation set. In one embodiment of the invention, the cardinality of the remainder subset of merged fragments (i.e., the number of tuples selected) may be determined based on another parameter—e.g., a Percentage of Data for Validation (PDV) parameter—specified in the verification policy (identified in Step 502), and retrieved prior to Step 526. The PDV parameter may be a numerical factor specifying the percentage of an input dataset (e.g., the set of merged fragments) to be used for optimizing DLM hyper-parameters. Optimization of DLM hyper-parameters may be performed during a validation phase for the DLM while undergoing supervised learning. In one embodiment of the invention, the PDV parameter may be also be expressed, mathematically, as: 100%−PDT. Further, following the above-mentioned example, had the PDT parameter specified a two-thirds (or approximately 67%) value, the PDV parameter would thus specify a one-third (or approximately 33%) value. Accordingly, the two remaining tuples of the six tuples specified in the set of merged fragments would be selected to create the validation set.

In Step 528, one or more DLM hyper-parameters are adjusted using the validation set (created in Step 526) and the VAT (obtained in Step 504). In one embodiment of the invention, a DLM hyper-parameter may refer to a configuration variable that is external to the DLM and whose value may not be estimated from data. Examples of a DLM hyper-parameter include, but are not limited to: the learning rate for training a neural network, or the soft margin cost function for a nonlinear support vector machine.

In one embodiment of the invention, adjustment of the DLM hyper-parameter(s) may entail, at least until a measured classification accuracy meets or exceeds the VAT: (i) feeding the first element of each tuple specified in the validation set (i.e., the raw data contained in the VOC and/or random fragments selected into the validation set)—designated as input data—through the DLM; (ii) obtaining, based on manipulation of the input data by current architectural information (described above) defining the DLM, class predictions for each tuple specified in the validation set (i.e., class predictions for each VOC and/or random fragment selected into the validation set)—designated as actual output data; (iii) comparing the actual output data against the second element of each tuple specified in the validation set (i.e., the categorical variable indicative of the target class—e.g., a valid target class or an invalid target class—for each VOC and/or random fragment selected into the validation set)—designated as desired output data; (iv) computing a measured classification accuracy based on the comparison of actual and desired output data performed in (iii); (v) in the observance of a measured classification accuracy below the VAT, quantifying any errors or differences between the actual and desired output data; and finally, (vi) adjusting one or more DLM hyper-parameters with the optimization goal of minimizing the errors quantified in (v) so that the actual output data near-matches, if not matches, the desired output data.

In Step 530, the optimal set of DLM parameters and hyper-parameters, for the DCS (obtained in Step 500), is stored. As mentioned above, in one embodiment of the invention, the optimal set of DLM parameters and hyper-parameters may refer to the final DLM parameter and hyper-parameter values attained after their final adjustment during the last training/validation iteration (i.e., during the processing of the last VOC (identified in Step 506) in/of the associated DCS). Further, in one embodiment of the invention, the optimal set of DLM parameters and hyper-parameters may be representative of the optimal architecture defining a data classifier (i.e., a DLM) for best-predicting the classification of ODS copy fragments that form ODS copies within a specific DCS. Moreover, storage of the optimal set of DLM parameters and hyper-parameters, for the DCS, may entail consolidating the architectural information in the DLM store (see e.g., FIG. 3).

Figure 6A:
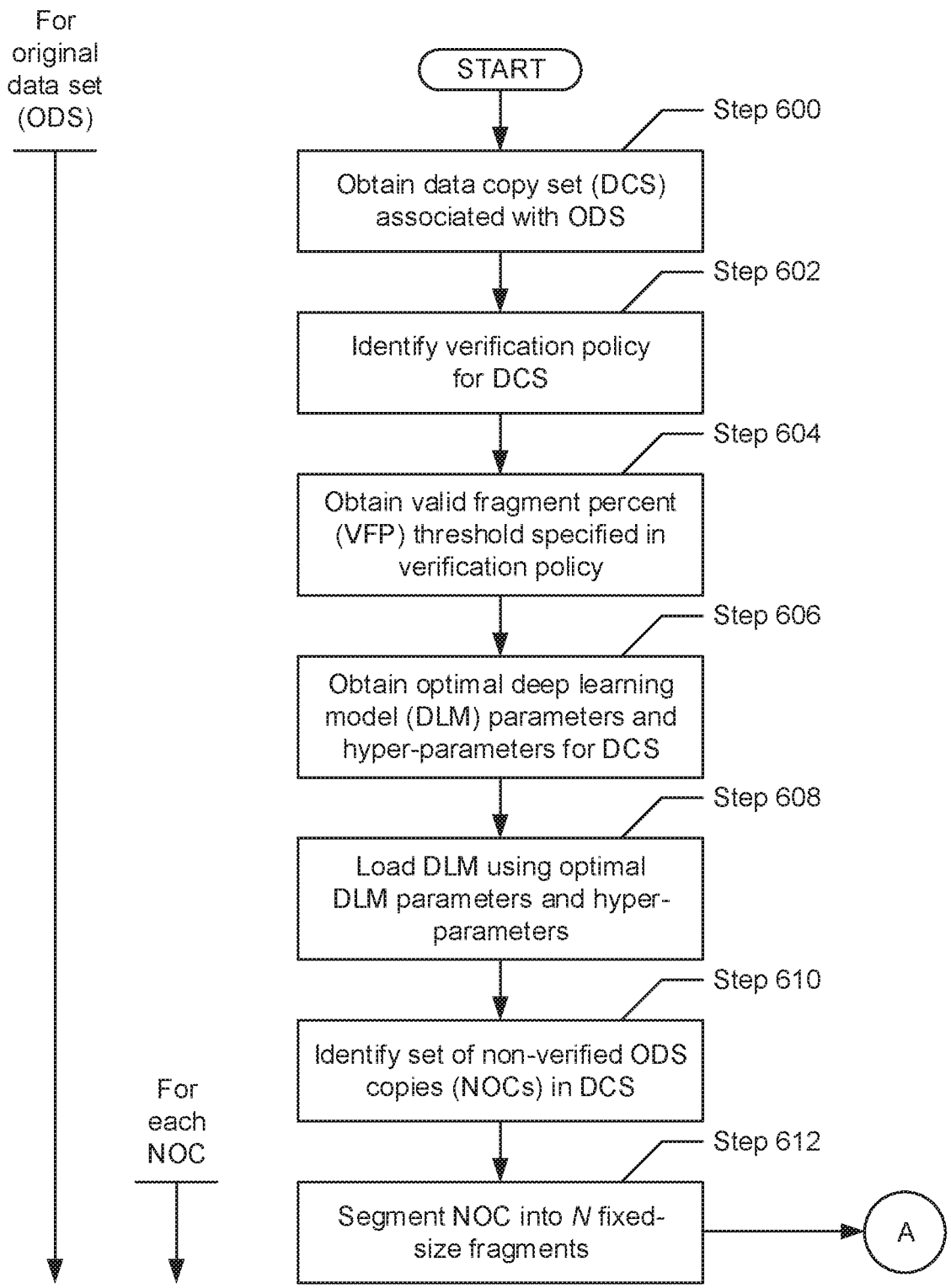
FIGS. 6A and 6B show flowcharts describing a method for verifying data copies in accordance with one or more embodiments of the invention.
Figure 6B:
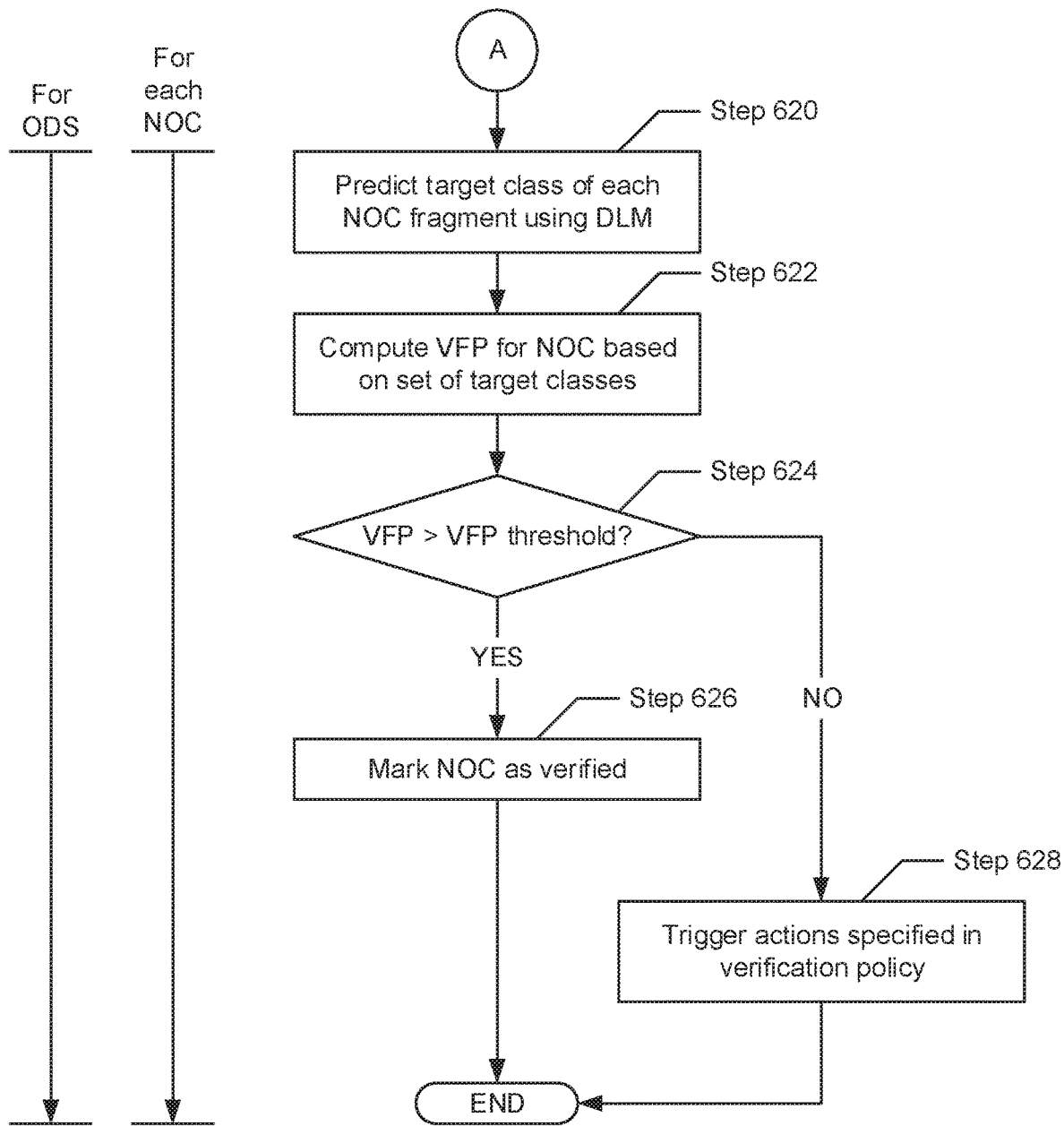

FIGS. 6A and 6B show flowcharts describing a method for verifying data copies in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 6A and 6B may be performed in parallel with any other steps shown in FIGS. 5A and 5B without departing from the scope of the invention.

Turning to FIG. 6A, in Step 600, for an original data set (ODS) (see e.g., FIG. 1), the data set copy (DCS) associated with the ODS is obtained. In one embodiment of the invention, the DCS may include a set of at least two ODS copies. Further, each ODS copy may be an exact copy of the ODS for a given time. The DCS may reside in a data repository on a data backup system (DBS) (see e.g., FIG. 1), and subsequently, may be retrieved therefrom.

In Step 602, the verification policy specific to the DCS (obtained in Step 600) is identified. In one embodiment of the invention, the verification policy may represent a set of rules and/or constraints that tailor the process of data copy verification, in accordance with embodiments of the invention, to the DCS. Further, the set of rules and/or constraints may take form as one or more workflows, actions, thresholds, and/or parameters (described above) (see e.g., FIG. 4). Moreover, identification of the verification policy may, for example, entail matching a verification policy identifier specified in records tied to the DCS (e.g., maintained by a data backup system (DBS) on which the DCS resides) and uniquely assigned to the verification policy.

In Step 604, a valid fragment percent (VFP) threshold is obtained. Specifically, the VFP threshold may be obtained from the verification policy (identified in Step 602) wherein the VFP threshold may be specified. In one embodiment of the invention, the VFP threshold may refer to a minimum numerical factor which must be met in order for an ODS copy (see e.g., FIG. 1) in/of the associated DCS (obtained in Step 600) to be marked as verified. Again, verified objects (e.g., ODS copies, ODS copy fragments, etc.) may refer to objects having data that may or may not include some data infection or corruption, where the extent of the data infection/corruption, if any, is within acceptable tolerances. More specifically, the VFP threshold may be a minimum percentage of a total number of ODS copy fragments that must be classified into the valid target class in order for the ODS copy (collectively defined by the raw data specified in the respective ODS copy fragments) to be labeled as verified. The valid target class, as described above, may refer to a set of objects (e.g., ODS copy fragments) having data that is verified.

By way of an example, consider an ODS copy of the DCS is undergoing the verification process. The ODS copy may be segmented into ten fixed-size ODS copy fragments. Thereafter, using the deep learning model (DLM), which had been previously optimized for the DCS (see e.g., FIGS. 5A and 5B), assume nine of the ten ODS copy fragments are classified into the valid target class—indicative that in at least those nine ODS copy fragments, the raw data specified therein may or may not include some data infection or corruption, where the extent of the data infection/corruption, if any, is within acceptable tolerances. Further, consider the VFP threshold, obtained from the verification policy for the DCS, specifies a value of 70%. Accordingly, the ODS copy (undergoing the verification process) may be labeled as verified because the actual percentage of ODS copy fragments (of the ODS copy) that are classified into the valid target class (i.e., 90%) meets or exceeds the specified VFP threshold.

In Step 606, a set of optimal DLM parameters and hyper-parameters is obtained. In one embodiment of the invention, the set of optimal DLM parameters and hyper-parameters refer to DLM architectural information that have been optimized, through supervised learning, for best-predicting the classification of ODS copy fragments that form ODS copies specific to the DCS (obtained in Step 600). Adjustment and attainment of these optimal DLM parameters and hyper-parameters are described in further detail above with respect to FIGS. 5A and 5B. Furthermore, the set of optimal DLM parameters and hyper-parameters may be retrieved from the DLM store (see e.g., FIG. 3).

In Step 608, a DLM is loaded using the set of optimal DLM parameters and hyper-parameters (obtained in Step 606). Specifically, a machine learning paradigm (e.g., neural network, decision tree, support vector machine, etc.) may be instantiated, and thereafter, any initial or default configuration variables (i.e., parameters and/or hyper-parameters) may be replaced with the set of optimal DLM parameters and hyper-parameters, thereby defining/obtaining an optimized DLM for specifically processing ODS copy fragments associated with the DCS.

In Step 610, a set of one or more non-verified ODS copies (NOCs), pertaining to the DCS (obtained in Step 600), is identified. In one embodiment of the invention, a NOC may refer to an ODS copy that may have been subjected to, and, subsequently, failed, an embedding-based data copy verification process, which is described in U.S. patent application Ser. No. 15/799,088, prior to proceeding to the data copy verification process disclosed herein. In failing the embedding-based data copy verification process, the NOC(s) may have been submitted for further, more-intensive inspection captured through embodiments disclosed herein.

Hereinafter, Steps 612 through 628—signifying a testing iteration—may be repeated multiple times based on the number of NOCs (identified in Step 610). Said another way, a testing iteration may elapse for each identified NOC in/of the associated DCS (obtained in Step 600). Further, at the conclusion of each testing iteration, the NOC respective to the testing iteration may or may not be marked as verified (described below).

With that said, in Step 612, for each NOC (identified in Step 610), the NOC is segmented. Specifically, in one embodiment of the invention, the NOC may be segmented into multiple fixed-size fragments. Each NOC fragment may, for example, be 1024 bytes (or 1 kilo-byte) long; however, one of ordinary skill will appreciate that the size of each NOC fragment may be any other specified length with the caveat that the size of each NOC fragment is the same as any other NOC fragment of the NOC.

Turning to FIG. 6B, in Step 620, each NOC fragment (obtained in Step 612) of a/the NOC is classified into a target class. In one embodiment of the invention, classifications for each NOC fragment may include, either: (a) a valid target class—inferring that the NOC fragment may or may not include some data infection or corruption, where the extent of the data infection/corruption, if any, is within acceptable tolerances, which may be indicative that the NOC fragment contains valid (or verifiable) data; or (b) an invalid target class—inferring that the NOC fragment includes data infection/corruption beyond acceptable tolerances, which alternatively may be indicative that the NOC fragment contains invalid (or unverifiable) data. One of ordinary skill will appreciate that additional or alternative target classes, other than the two exemplified above, may be designated. Furthermore, in one embodiment of the invention, classification of a NOC fragment into a target class may entail: (i) feeding the raw data contained in the NOC fragment—designated as input data—through the DLM (loaded in Step 608); and (ii) obtaining a class prediction for the NOC fragment based on manipulation of the input data by the optimal architectural information (i.e., the set of optimal DLM parameters and hyper-parameters) defining the DLM.

In one embodiment of the invention, after the class predictions for each NOC fragment are obtained, an offset-classification map (OCM), for the NOC, may be generated. The OCM may be a data structure or a data container (e.g., text file, spreadsheet, binary file, etc.) for storing entries of NOC fragment offset to predicted classification mappings. That is, each OCM entry may pertain to a NOC fragment of the NOC. Furthermore, each OCM entry may specify a NOC fragment offset and a corresponding NOC fragment class prediction. In one embodiment of the invention, a NOC fragment offset may be an integer (or any other numerical representation) indicating the distance (or displacement) between the beginning of the NOC and the data location wherefrom the NOC fragment starts. For example, given that each NOC fragment may be 1024 bytes long, a first NOC fragment may have a NOC fragment offset of 0, the second NOC fragment may have a NOC fragment offset of 1024, a third NOC fragment may have a NOC fragment offset of 2048, and so forth. In one embodiment of the invention, the NOC fragment class prediction may be the target class of the NOC fragment (predicted by the DLM earlier). Moreover, upon generation, the OCM may be stored, temporarily or permanently, within the verification policy for the DCS (identified in Step 602) until retrieved (see e.g., Step 628).

In Step 622, for each NOC (identified in Step 610), a VFP is computed based on the NOC fragment class predictions (obtained in Step 620). In one embodiment of the invention, the VFP may be a measurement specifying the percentage of a total number of NOC fragments, of the NOC, that has been classified into the valid target class. For example, consider a NOC that includes ten NOC fragments. Further, after subjection through the DLM, three of the ten NOC fragments are classified into the valid target class. Based on this example, the VFP for the NOC is computed to be 30%, signifying that 3 of 10 NOC fragments have been predicted to contain valid (or verifiable) data.

In Step 624, for each NOC (identified in Step 610), a determination is made as to whether the VFP (computed for the NOC in Step 622) meets or exceeds the VFP threshold (obtained in Step 604). If it is determined that the VFP does meet or exceeds the VFP threshold, then the process proceeds to Step 626. On the other hand, if it is alternatively determined that the VFP does not at least meet (i.e., falls short of) the VFP threshold, then the process proceeds to Step 628.

In Step 626, after determining (in Step 624) that the VFP (computed for a NOC in Step 622) meets or exceeds the VFP threshold (obtained in Step 604), the NOC (associated with the current testing iteration) is marked as verified. In one embodiment of the invention, marking the NOC as verified may, for example, entail modifying a metadata parameter associated with the NOC from an unverified state to a verified state. In such an embodiment, the unverified state of an ODS copy (e.g., the NOC) may be indicative that the ODS copy has yet be assessed for the presence of data infection/corruption, or alternatively, that the ODS copy has at least failed the embedding-based data copy verification process described in U.S. patent application Ser. No. 15/799, 088. Conversely, the verified state of an ODS copy (e.g., the NOC) may be indicative that the ODS copy has undergone data integrity assessment, and may or may not include some data infection or corruption, where the extent of the data infection/corruption, if any, is within acceptable tolerances.

In Step 628, after alternatively determining (in Step 624) that the VFP (computed for a NOC in Step 622) does not at least meet the VFP threshold (obtained in Step 604), one or more actions (see e.g., FIG. 4) specified in the verification policy (identified in Step 602) for the DCS (obtained in Step 600) is/are triggered. Examples of an action include, but are not limited to including: (i) the issuance of a notification, to appropriate parties, relaying at least the workflow condition (s) that had been fulfilled; (ii) the marking of one or more vetted (i.e., already verified) ODS copies, in/of an associated DCS, as immutable—thereby locking the state or data of the vetted ODS copies so that their state/data can no longer be modified; (iii) the replication and transfer of one or more vetted ODS copies, in/of an associated DCS, to an additional storage system operatively connected to a data backup system (DBS) (see e.g., FIG. 1); (iv) the submission of one or more infected/compromised ODS copies, in/of an associated DCS, for additional, more intensive data integrity evaluations; (v) the deactivation of the DBS on which one or more infected/compromised ODS copies, in/of an associated DCS, resides; and (vi) the disabling of one or more network interfaces of the DBS on which one or more infected/compromised ODS copies, in/of an associated DCS, resides. Further, with respect to the latter two action examples, deactivation of the DBS, and/or the disabling of network interfaces residing on the DBS, may quarantine the DBS, thereby, preventing the spread of data infection/corruption to other networked components.

In one embodiment of the invention, and as mentioned in above-exemplified action (iv), one or more infected/compromised ODS copies (in/of the DCS) may be subjected to more intensive data integrity evaluations. These additional evaluations may entail the execution of further automated algorithms, or alternatively, may entail human-aided inspections, where human operators (e.g., data integrity experts, cyber security experts, etc.), at least in part, assess the infected/compromised ODS copies. With respect to embodiments where human-aided inspections are to take place, one or more OCMs (generated in Step 620) may be submitted along with the infected/compromised ODS copies. Each OCM may be retrieved from the verification policy associated with the DCS pertaining to an infected/compromised ODS copy. Further, these one or more OCMs may enable a human operator to focus on inspecting ODS copy data fragments that had been classified (by the DLM) into the invalid target class.

Figure 7:
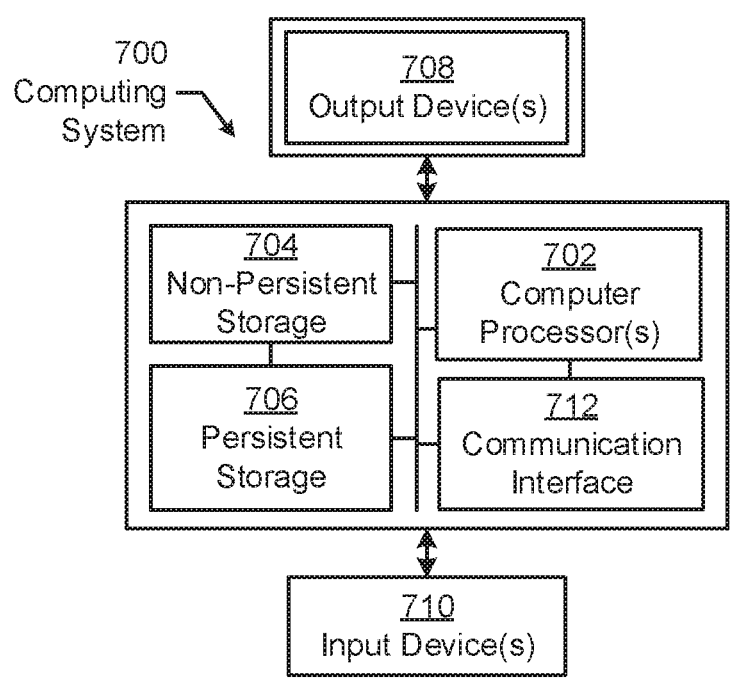
FIG. 7 shows a computing system in accordance with one or more embodiments of the invention.

FIG. 7 shows a computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Embodiments of the invention relate to implementing an automated agent for data copy verification. Specifically, embodiments of the invention apply deep learning algorithms to assess the validity (or invalidity) of data copy segments. Various corrective actions are subsequently triggered upon determination that one or more data copies are likely corrupted or infected. Advantages introduced by one or more embodiments of the invention may include: (i) seamless integration into any existing storage and/or backup systems that include functionality to manage data copies; (ii) portability, since the disclosed invention may be ported to execute on primary storage/backup systems, other systems external to the primary storage/backup systems, or in the cloud as a service; (iii) avoidance in unnecessarily inspecting data copies that fail to exhibit behaviors commensurate with cyber security attacks/threats, which parallels avoiding the unnecessary commitment of resources; and (iv) providing data recovery assurance through the observation of states between data copies.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for verifying data copies, comprising:
    obtaining, for an original data set (ODS), a data copy set (DCS) associated with the ODS;
    loading a deep learning model (DLM) optimized for the DCS;
    identifying a first non-verified ODS copy (NOC) specified in the DCS;
    segmenting the first NOC into a first plurality of NOC fragments;
    predicting, using the DLM, a first plurality of target classes for the first plurality of NOC fragments; and
    marking, based on the first plurality of target classes, the first NOC as verified.

2. The method of claim 1, further comprising:
    prior to loading the DLM optimized for the DCS:
        identifying a verification policy for the DCS;
        obtaining, from the verification policy, a training accuracy threshold (TAT);
        identifying a plurality of verified ODS copies (VOCs) specified in the DCS;
        for each VOC of the plurality of VOCs:
            segmenting the VOC into a plurality of VOC fragments;
            associating the plurality of VOC fragments with a valid target class, to create a plurality of valid data tuples;
            generating a plurality of random fragments, wherein each random fragment comprises random data;
            associating the plurality of random fragments with an invalid target class, to create a plurality of invalid data tuples;
            generating a merged fragments superset using the plurality of valid data tuples and the plurality of invalid data tuples;
            selecting a random subset of the merged fragments superset as a training set; and
        identifying an optimal set of DLM parameters, defining the DLM optimized for the DCS, based on the training set for each VOC and the TAT.

3. The method of claim 2, wherein each valid data tuple comprises a first element and a second element, wherein the first element is raw data contained in a VOC fragment, wherein the second element is a categorical variable representative of the valid target class.

4. The method of claim 2, wherein each invalid data tuple comprises a first element and a second element, wherein the first element is the random data contained in a random fragment, wherein the second element is a categorical variable representative of the invalid target class.

5. The method of claim 2, further comprising:
obtaining, from the verification policy, a validation accuracy threshold (VAT);
for each VOC of the plurality of VOCs:
selecting a remainder subset of the merged fragments superset as a validation set; and
identifying an optimal set of DLM hyper-parameters, further defining the DLM optimized for the DCS, based on the validation set for each VOC and the VAT.

6. The method of claim 1, wherein marking the first NOC as verified based on the first plurality of target classes, comprises:
identifying a verification policy for the DCS;
obtaining, from the verification policy, a valid fragment percent (VFP) threshold;
computing a VFP for the first NOC using the first plurality of target classes, wherein the VFP quantifies a percentage of the first plurality of NOC fragments that have been classified into a valid target class;
determining that the VFP at least meets the VFP threshold; and
modifying, based on the determining, a metadata parameter associated with the first NOC to a verified state.

7. The method of claim 1, further comprising:
identifying a second NOC specified in the DCS;
segmenting the second NOC into a second plurality of NOC fragments;
predicting, using the DLM, a second plurality of target classes for the second plurality of NOC fragments; and
triggering, based on the second plurality of target classes, at least one action specified in a verification policy for the DCS.

8. The method of claim 7, wherein triggering at least one action based on the second plurality of target classes, comprises:
identifying the verification policy for the DCS;
obtaining, from the verification policy, a valid fragment percent (VFP) threshold;
computing a VFP for the second NOC using the second plurality of target classes, wherein the VFP quantifies a percentage of the second plurality of NOC fragments that have been classified into a valid target class;
determining that the VFP does not at least meet the VFP threshold; and
invoking, based on the determining, the at least one action specified in the verification policy.

9. A data backup system (DBS), comprising:
a first computer processor;
a first data repository operatively connected to the first computer processor; and
a copy verification agent (CVA) executing on the first computer processor, and programmed to:
obtain, for an original data set (ODS), a data copy set (DCS) from the first data repository, wherein the DCS is associated with the ODS;
load a deep learning model (DLM) optimized for the DCS;
identify a non-verified ODS copy (NOC) specified in the DCS;
segment the NOC into a plurality of NOC fragments;
predict, using the DLM, a plurality of target classes for the plurality of NOC fragments; and
mark, based on the plurality of target classes, the NOC as verified.

10. The DBS of claim 9, further comprising:
an application program interface (API), and a storage semantics agent (SSA) executing on the first computer processor.

11. The DBS of claim 10,
wherein a second data repository is operatively connected to the DBS, wherein the second data repository stores the ODS.

12. The DBS of claim 11,
wherein a client computing system (CCS) is operatively connected to the DBS, and comprises:
a second computer processor;
a second data repository operatively connected to the second computer processor; and
a data copy agent (DCA) executing on the second computer processor.

13. A non-transitory computer readable medium (CRM) comprising computer readable program code, which when executed by a computer processor, enables the computer processor to:
obtain, for an original data set (ODS), a data copy set (DCS) associated with the ODS;
load a deep learning model (DLM) optimized for the DCS;
identify a first non-verified ODS copy (NOC) specified in the DCS;
segment the first NOC into a first plurality of NOC fragments;
predict, using the DLM, a first plurality of target classes for the first plurality of NOC fragments; and
mark, based on the first plurality of target classes, the first NOC as verified.

14. The non-transitory CRM of claim 13, further comprising computer readable program code, which when executed by the computer processor, enables the computer processor to:
prior to loading the DLM optimized for the DCS:
identify a verification policy for the DCS;
obtain, from the verification policy, a training accuracy threshold (TAT);
identify a plurality of verified ODS copies (VOCs) specified in the DCS;
for each VOC of the plurality of VOCs:
segment the VOC into a plurality of VOC fragments;
associate the plurality of VOC fragments with a valid target class, to create a plurality of valid data tuples;
generate a plurality of random fragments, wherein each random fragment comprises random data;
associate the plurality of random fragments with an invalid target class, to create a plurality of invalid data tuples;
generate a merged fragments superset using the plurality of valid data tuples and the plurality of invalid data tuples;
select a random subset of the merged fragments superset as a training set; and
identify an optimal set of DLM parameters, defining the DLM optimized for the DCS, based on the training set for each VOC and the TAT.

15. The non-transitory CRM of claim 14, wherein each valid data tuple comprises a first element and a second element, wherein the first element is raw data contained in a VOC fragment, wherein the second element is a categorical variable representative of the valid target class.

16. The non-transitory CRM of claim 14, wherein each invalid data tuple comprises a first element and a second element, wherein the first element is the random data contained in a random fragment, wherein the second element is a categorical variable representative of the invalid target class.

17. The non-transitory CRM of claim 14, further comprising computer readable program code, which when executed by the computer processor, enables the computer processor to:
   obtain, from the verification policy, a validation accuracy threshold (VAT);
   for each VOC of the plurality of VOCs:
      select a remainder subset of the merged fragments superset as a validation set; and
      identify an optimal set of DLM hyper-parameters, further defining the DLM optimized for the DCS, based on the validation set for each VOC and the VAT.

18. The non-transitory CRM of claim 13, further comprising computer readable program code, which when executed by the computer processor, enables the computer processor to:
   in order to mark the first NOC as verified based on the first plurality of target classes:
      identify a verification policy for the DCS;
      obtain, from the verification policy, a valid fragment percent (VFP) threshold;
      compute a VFP for the first NOC using the first plurality of target classes, wherein the VFP quantifies a percentage of the first plurality of NOC fragments that have been classified into a valid target class;
      make a determination that the VFP at least meets the VFP threshold; and
      modify, based on the determination, a metadata parameter associated with the first NOC to a verified state.

19. The non-transitory CRM of claim 13, further comprising computer readable program code, which when executed by the computer processor, enables the computer processor to:
   identify a second NOC specified in the DCS;
   segment the second NOC into a second plurality of NOC fragments;
   predict, using the DLM, a second plurality of target classes for the second plurality of NOC fragments; and
   trigger, based on the second plurality of target classes, at least one action specified in a verification policy for the DCS.

20. The non-transitory CRM of claim 19, further comprising computer readable program code, which when executed by the computer processor, enables the computer processor to:
   in order to trigger at least one action based on the second plurality of target classes:
      identify the verification policy for the DCS;
      obtain, from the verification policy, a valid fragment percent (VFP) threshold;
      compute a VFP for the second NOC using the second plurality of target classes, wherein the VFP quantifies a percentage of the second plurality of NOC fragments that have been classified into a valid target class;
      make a determination that the VFP does not at least meet the VFP threshold; and
      invoke, based on the determination, the at least one action specified in the verification policy.

\* \* \* \* \*